(12) United States Patent
Wang et al.

(10) Patent No.: US 12,288,121 B2
(45) Date of Patent: Apr. 29, 2025

(54) HUMIDITY MONITORING SYSTEM

(71) Applicant: Brillian Network & Automation Integrated System Co., Ltd., Miaoli County (TW)

(72) Inventors: Yung-Chin Wang, Miaoli County (TW); Chi-Hao Lin, Miaoli County (TW)

(73) Assignee: BRILLIAN NETWORK & AUTOMATION INTEGRATED SYSTEM CO., LTD., Miaoli County (TW)

( * ) Notice: Subject to any disclaimer, the term of this patent is extended or adjusted under 35 U.S.C. 154(b) by 207 days.

(21) Appl. No.: 18/079,122

(22) Filed: Dec. 12, 2022

(65) Prior Publication Data
US 2024/0005108 A1 Jan. 4, 2024

(30) Foreign Application Priority Data

Jul. 1, 2022 (TW) .................................. 111124672
Jul. 1, 2022 (TW) .................................. 111206995

(51) Int. Cl.
*G06K 7/10* (2006.01)
(52) U.S. Cl.
CPC ..... *G06K 7/10297* (2013.01); *G06K 7/10356* (2013.01)

(58) Field of Classification Search
CPC ...................... G06K 7/10297; G06K 7/10356
See application file for complete search history.

(56) References Cited

U.S. PATENT DOCUMENTS

| 2009/0009287 | A1* | 1/2009 | Falcioni | H04L 12/2803 340/10.1 |
|---|---|---|---|---|
| 2017/0354920 | A1* | 12/2017 | Switzer | E03B 3/28 |
| 2020/0349329 | A1* | 11/2020 | Vogt | G01D 21/02 |
| 2024/0005108 | A1* | 1/2024 | Wang | G06K 7/10297 |

* cited by examiner

*Primary Examiner* — Omeed Alizada
(74) *Attorney, Agent, or Firm* — MUNCY, GEISSLER, OLDS & LOWE, P.C.

(57) ABSTRACT

A monitoring system includes a first monitoring module, a flow controller, a control device and a first signal conversion module. The first monitoring module electrically connects a humidity sensor for detecting the relative humidity of a field. The control device has a control unit and the data of an inflation rate table are stored therein, and the inflation rate table provides the reference inflation rate corresponding to the relative humidity data. The flow controller electrically connects the control device, and the control unit controls the flow controller to adjust inflation flow according to the reference inflation rate. The first signal conversion module electrically connects the control device and the first monitoring module.

8 Claims, 2 Drawing Sheets

HUMIDITY MONITORING SYSTEM

CROSS-REFERENCE TO RELATED APPLICATIONS

This application claims the benefit of TW Patent Application No. 11124672, filed Jul. 1, 2022 and TW Patent Application No. 111206995, filed Jul. 1, 2022, which are incorporated in its entirety by reference herein.

FIELD OF THE INVENTION

The present invention relates to a monitoring system, particularly relates to a monitoring system that can detect the relative humidity of the environment and control the switch of the inflation flow.

BACKGROUND OF THE INVENTION

Generally, most semiconductor materials such as reticles and wafers are stored in boxes such as reticle boxes or wafer boxes, and in order to avoid oxidation or pollution during storage, they must be stored in an environment with the non-oxidizing gas. Therefore, it would be better to store such boxes in an environment with a non-oxidizing gas and an adequate relative humidity to ensure the cleanliness of these boxes.

Currently, the method for storing the reticle box and the wafer box is to store in a nitrogen cabinet connecting to a nitrogen bottle through a pipeline to continuously replenish nitrogen gas with fixed quantities at fixed time. In order to ensure the cleanliness of the storage environment, nitrogen gas must be successively and quantitatively replenished in the nitrogen cabinet. However, the long-term maintenance of the relative humidity of the storage environment is costly.

Accordingly, it is an important issue of the present invention to provide a method to maintain the relative humidity of the storage environment and effectively reduce the cost.

SUMMARY OF THE INVENTION

In order to solve the problems of the prior art, the present invention provides a monitoring system that can detect the relative humidity of the environment, such as a field, and control the inflation flow by the control unit to determine whether to inflate the field to achieve the purpose of saving the gas cost.

Another object of the present invention is to provide different inflation rates according to different relative humidity in the environment, and the control unit controls the flow controller to adjust the actual inflation rate according to the reference inflation rate corresponding to the inflation rate table to achieve the purpose of saving the gas cost.

Another object of the present invention is that the flow controller can adjust the actual inflation rate in real time because of the data variety of the relative humidity, so the present invention can further save electric energy or energy consumption to reduce the cost.

According to the above subjects, the present invention provides a monitoring system includes: a first monitoring module, a flow controller, a control device and a first signal conversion module. The first monitoring module electrically connects a humidity sensor detecting the relative humidity of a field. The flow controller controls the inflation flow. The control device has a control unit and has the data of an inflation rate table stored therein, wherein the inflation rate table provides the different reference inflation rates corresponding to the different relative humidity data. The control unit controls the flow controller to adjust inflation flow according to the different reference inflation rate. The first signal conversion module electrically connects the control device and the first monitoring module.

DETAILED DESCRIPTION OF THE PREFERRED EMBODIMENT

The advantages and features of the present invention can be more easily understood if referring to the exemplary embodiments and the accompanying drawings of the present invention. However, the intention is not to limit the present invention only to these embodiments set forth herein. On the contrary, these provided embodiments are to offer a thorough and complete disclosure of the scope of the present invention.

Figure 1:
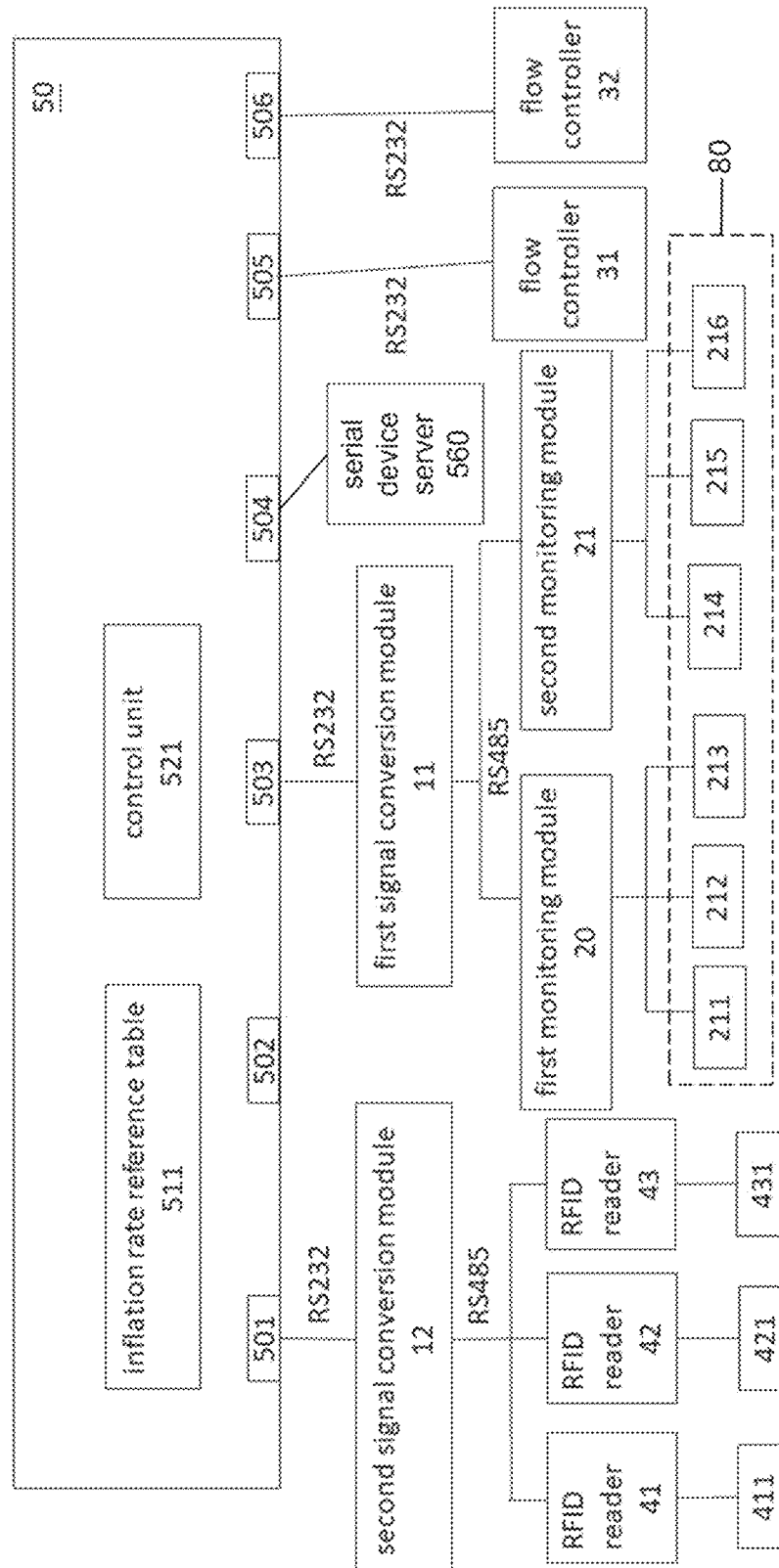
FIG. 1 is a system architecture diagram of a monitoring system of the present invention.

First, please refer to FIG. 1, FIG. 1 is a system architecture diagram of a monitoring system of the present invention. As shown in FIG. 1, the monitoring system of the present invention includes: a first monitoring module 20, a flow controller 31, a control device 50 and a first signal conversion module 11. The first signal conversion module 11 can be a gateway or a circuit board for converting different communication protocols and electrically connected to the first monitoring module 20. For example, the communication protocol between the first signal conversion module 11 and the first monitoring module 20 is RS485 or Modbus, and the communication protocol between the first signal conversion module 11 and the control device 50 is RS232 or Ethernet. The first signal conversion module 11 can convert the signal from RS485 to RS232 to report it to the control device 50. Because the communication protocol has various combinations, it is not limited in the present invention. The control device 50 may be an industrial computer with multiple communication ports such as six communication ports respectively namely communication ports 501, 502, 503, 504, 505 and 506, wherein the communication port 503 is electrically connected the first signal conversion module 11, the communication port 505 is electrically connected to the flow controller 31, and the other communication ports 501, 502, 504, and 506 can be used for other purposes. If the communication ports are insufficient, the control device 50 may further comprise at least one virtual RS232 module (serial device server) (not 560, such as shown in FIG. 1) to expand the number of communication ports. For example, the virtual RS232 module may be the MOXA NPort 5400 series product. The first signal conversion module 11, the second signal conversion module 12 or the flow controller 31 can be electrically connected to the virtual RS232 module. The first monitoring module 20 is electrically connected to the humidity sensor 211 for detecting the relative humidity of a field, such as a cabinet 80 shown in FIG. 1, and transmitting the relative humidity data of the field to the control device 50 by the first signal conversion module 11. In another embodiment, the humidity sensor 211 is a temperature and humidity sensor, which can simultaneously detect temperature and relative humidity. The first monitoring module 20 may not only be electrically connected to the humidity sensor 211 but may also be electrically connected to at least one of the oxygen sensor 212, the temperature sensor 213, the dew point sensor 214, the pressure sensor 215 and the flow monitor 216 for respectively detecting the values of oxygen content, temperature, dew point, pressure and flow. Referring to FIG. 1, in one embodiment, in addition to the first monitoring module 20, there is a second monitoring module 21 electrically connected to the first signal conversion module 11. Likely, the second monitoring module 21 can be electrically connected to at least one of the humidity sensor 211, the oxygen sensor 212, the temperature sensor 213, the dew point sensor 214, the pressure sensor 215 and the flow monitor 216. In FIG. 1, the first monitoring module 20 is electrically connected to the humidity sensor 211, the oxygen sensor 212 and the temperature sensor 213, and the second monitoring module 21 is electrically connected to the dew point sensor 214, the pressure sensor 215 and the flow monitor 216. The functions of the first monitoring module 20 and the second monitoring module 21 are the same, and both can be electrically connected to a plurality of sensors or monitors, respectively, and transmit the values detected by the sensors or monitors through the first signal conversion module 11. The first signal conversion module 11 reports the relevant data to the control device 50. The first monitoring module 20 and the second monitoring module 21 can be respectively a control circuit board such as a I/O circuit board or an analog circuit board, and are responsible for signal reception, transmission, and control. When the environmental changes in the field (relative humidity, temperature, pressure, oxygen content or dew point) are higher than the set value, an alarm will be raised to remind the user, and the alarm can be in the form of a warning light or a sound. Alternatively, the field can be a cabinet 80 with at least a front door or drawers. When the front door is closed, there is at least an enclosed space inside the cabinet. The cabinet can be filled with inert gas or extreme clean dry gas (XCDA). For example, when the front door is closed, the cabinet is filled with nitrogen gas, and the cabinet is pre-filled with the XCDA before the front door is opened or the nitrogen gas is exhausted.

The control device 50 is electrically connected to at least one flow controller 31 for controlling and adjusting the inflation flow. The gas can be an inert gas or the XCDA. As shown in FIG. 1, the flow controllers 31 and 32 are respectively electrically connected to the communication ports 505 and 506 of the control device 50 and use the RS232 communication protocol to transmit data. For example, the flow controller 31 controls the flow of the inert gas (such as nitrogen gas), and the flow controller 32 controls the flow of the XCDA. The control device 50 has a control unit 521 and stores the data of the inflation rate table 511. The data in the inflation rate table 511 comprises the relative humidity data and the corresponding reference inflation rate. The control unit 521 can check the relative humidity data reported by the sensor 211 in the field. Based on the relative humidity data, the control unit 521 can control the flow controllers 31 and 32 to adjust and provide the actual inflation rate according to the reference inflation rate corresponding to the inflation rate table 511. Of course, in another embodiment, the flow controller 32 may also be omitted or the function of the flow controller 32 may be turned off, and only the flow controller 31 for adjusting the flow of the inert gas is retained. The control unit 521 may be, for example, a programmable logic controller (PLC) or a central processing unit (CPU), which is not limited herein. In addition, the user can also use the terminal device (not shown in the figure) to remotely communicate with the control device 50 to check the data reported by the sensor, wherein the terminal device (not shown in the figure) can be a mobile phone, PC, Server, Notebook or Palmtop.

When the field is a cabinet, such as a cabinet with multi-layer racks, at least one object (not shown in the figure) can be placed in the cabinet, and the object can be a reticle, a reticle box, a wafer box, a wafer, a probe card, a probe card box or other semiconductor-related materials, wherein the object may be provided with a radio frequency identification (RFID) tag storing the information read by the RFID reader 41 and reported to the control device 50. As shown in FIG. 1, the second signal conversion module 12 is electrically connected to the communication port 501 of the control device 50, and the RFID readers 41, 42 and 43 are electrically connected to the second signal conversion module 12. The RFID readers 41, 42 and 43 are respectively electrically connected to the antenna elements 411, 421, 431. The second signal conversion module 12 can be a gateway or a circuit board for converting different communication protocols, for example, converting the signals detected by the antenna elements 411, 421 and 431 from RS485 to RS232 and reporting it to the control device 50.

Especially, the inflation rate table 511 of the present invention is a comparison chart of the relationship between the relative humidity change and the reference inflation rate, and different gases can have different tables (inflation rate table 511). The inflation rate table provides a reference inflation rate corresponding to at least one relative humidity data, preferably a plurality of reference inflation rates corresponding to a plurality of different relative humidity data. The control unit 50 controls the flow controller 31 to provide the adequate inflation rate corresponding to the relative humidity in the field according to the data of the inflation rate table 511 which show the relationship between the relative humidity and the reference inflation rate. The actual inflation rate may be determined according to the difference from a preset threshold, and generally, the larger the difference, the faster the inflation rate. For example, the preset threshold can be set to a relative humidity 5%. When the relative humidity detected in the field is 50%, the difference from the threshold value is 45%. When the relative humidity detected in the field is 30%, the difference from the threshold is 25%. Accordingly, the inflation rate when the relative humidity in the field is 50% is higher than the inflation rate when the relative humidity in the field is 30% to prevent the object from being in a high humidity environment for too long. In addition, it is also possible that a fixed inflation rate is provided when the relative humidity is in a certain interval, but a different inflation rate is provided when the relative humidity is in a different interval. For example, as shown in Table 1, when the relative humidity in the field is in the first interval, such as 40% to 50%, a first inflation rate of nitrogen gas, for example, 50 liter/min is provided; when the relative humidity in the field is in the second interval, such as 20% to 30%, a second inflation rate of nitrogen gas, for example, 30 liter/min is provided. That is, when the relative humidity of the first interval is greater than the relative humidity of the second interval, the first inflation rate is greater than the second inflation rate. In table 1, the inflation rate table 511 is established for the relationship between different gases and humidity. In the following embodiments, the specific gas will be described as an example. The theoretical best case is that the actual inflation rate in the field is equal to the reference inflation rate, but the actual situation may vary slightly.

TABLE 1

Inflation Rate Table

| Relative Humidity | XCDA Inflation Rate (liter/min) | Nitrogen Inflation Rate (liter/min) |
|---|---|---|
| 50% | 200 | 50 |
| 40% | 200 | 50 |
| 30% | 100 | 30 |
| 20% | 100 | 30 |
| 10% | 50 | 25 |
| 5% | 50 | 15 |
| 0% | 50 | 15 |

Next, in one embodiment, assuming that the preset relative humidity value in the field (for example, a cabinet) is set as 5% as the preset threshold, when the humidity sensor 211 detects the relative humidity 50% in the field, the control device 50 will regulate the flow controller 31 to inflate the field by an inflation rate corresponding to the reference inflation rate at the relative humidity 50% in the inflation rate table 511. For example, use XCDA to inflate the field referring to the reference inflation rate, 200 liter/min, in the inflation rate table 511. When the humidity sensor 211 detects that the relative humidity value in the field drops from 50% to 30%, the control unit 521 can instantly adjust the inflation rate according to the reference inflation rate at the relative humidity 30% in the inflation rate table 511. For example, use XCDA to inflate the field referring to the reference inflation rate, 100 liter/min, in the inflation rate table 511. And so on, until the relative humidity in the field meets the preset relative humidity value 5%. That is, the actual inflation rate inflating the field is adjusted in time with reference to the corresponding reference inflation rate in the inflation rate table 511 according to the relative humidity detected by the humidity sensor 211 in the field. In theoretically, the preferred case is that the actual inflation rate in the field is equal to the reference inflation rate, but the actual situation may vary slightly. Generally, the greater the difference between the detected relative humidity value and the preset threshold value, the higher the inflation rate, so as to quickly reduce the relative humidity in the field to be equal to or lower than the preset threshold value. Hence, the relative humidity value can be quickly reduced, and the gas consumption can be saved. In addition, such as listed in Table 1, a fixed inflation rate is provided when the relative humidity is in a certain interval. When the relative humidity of the field in the first interval is detected to be 40% to 50% in the field, the first inflation rate is adopted. For example, use XCDA to inflate referring to the reference inflation rate, 200 liter/min, in the inflation rate table 511. When the relative humidity of the field in the second interval is detected in the field to be 20% to 30%, the second inflation rate is adopted referring to the reference inflation rate, 100 liter/min, in the inflation rate meter 511. When the relative humidity in the field drops to 5%, which is the preset threshold, the humidity sensor 211 will continue to detect the relative humidity data in the field and continue to transmit the detected relative humidity data to the control device 50. After a period, such as 30 minutes, when the humidity sensor 211 detects that the relative humidity data in the field exceeds the preset threshold value 5% again, the control device 50 operate the flow controller 31 to adjust the inflation rate in the field using the reference inflation rate corresponding to the relative humidity data in the inflation rate table 511. When the relative humidity data dropping to the preset threshold of the relative humidity 5% or lower again, the process of inflation is stopped, and the humidity sensor 211 will continuously keep monitoring the environment in the field. In theoretically, the preferred case is that the actual inflation rate in the field is equal to the reference inflation rate, but the actual situation may vary slightly.

In the foregoing, the inflation rate in the field is related to the relative humidity data in the field, and the inflation rate will be adjusted according to the relative humidity data in the field. When the real relative humidity is much higher than the preset relative humidity, a faster inflation rate can be used. When the real relative humidity in the field decreases with the increase of the gas inflation time, the control unit 521 can reduce the inflation rate, so that the inflation rate can be adjusted as the inflation time increases. In addition to saving gas costs, it can further save electricity or energy consumption and further reduce costs.

In normal condition, when the field is a enclosed environment, the relative humidity in the field changes slowly, so when the humidity deviates from the preset value, it can be adjusted back to the preset value by fine-tuning. If the humidity sensor 211 detects a drastic change in relative humidity, the flow controller 31 needs to quickly inflate the field or complete the inflation within a certain inflation time. Since the relative humidity of the environment is a variable data, it is necessary to have an inflation rate table 511 for the control device 50 as a control basis. Of course, the preset data of the relative humidity can be adjusted according to requirements and should not be limited to the embodiments set forth herein. In addition, when the humidity sensor 211 detects a drastic change in the relative humidity, the control device 50 will issue a warning, such as a buzzer sound or a warning light, to remind the operator that there may be abnormal in the field and should check immediately to maintain a proper storage environment. In addition, the user can also remotely communicate with the control device 50 through the terminal device (not shown in the figure) to monitor the relative humidity data reported by the first monitoring module 20 or the second monitoring module 21. Evenly, the temperature, pressure, oxygen content, gas flow or dew point, etc. can be monitored to confirm whether the monitoring value in the field is normal. At the same time, the user can also adjust the warning parameters of the control device 50 through the terminal device, which would receive an alert when the reported monitoring data reaches any specified value as the user requirement.

Figure 2:
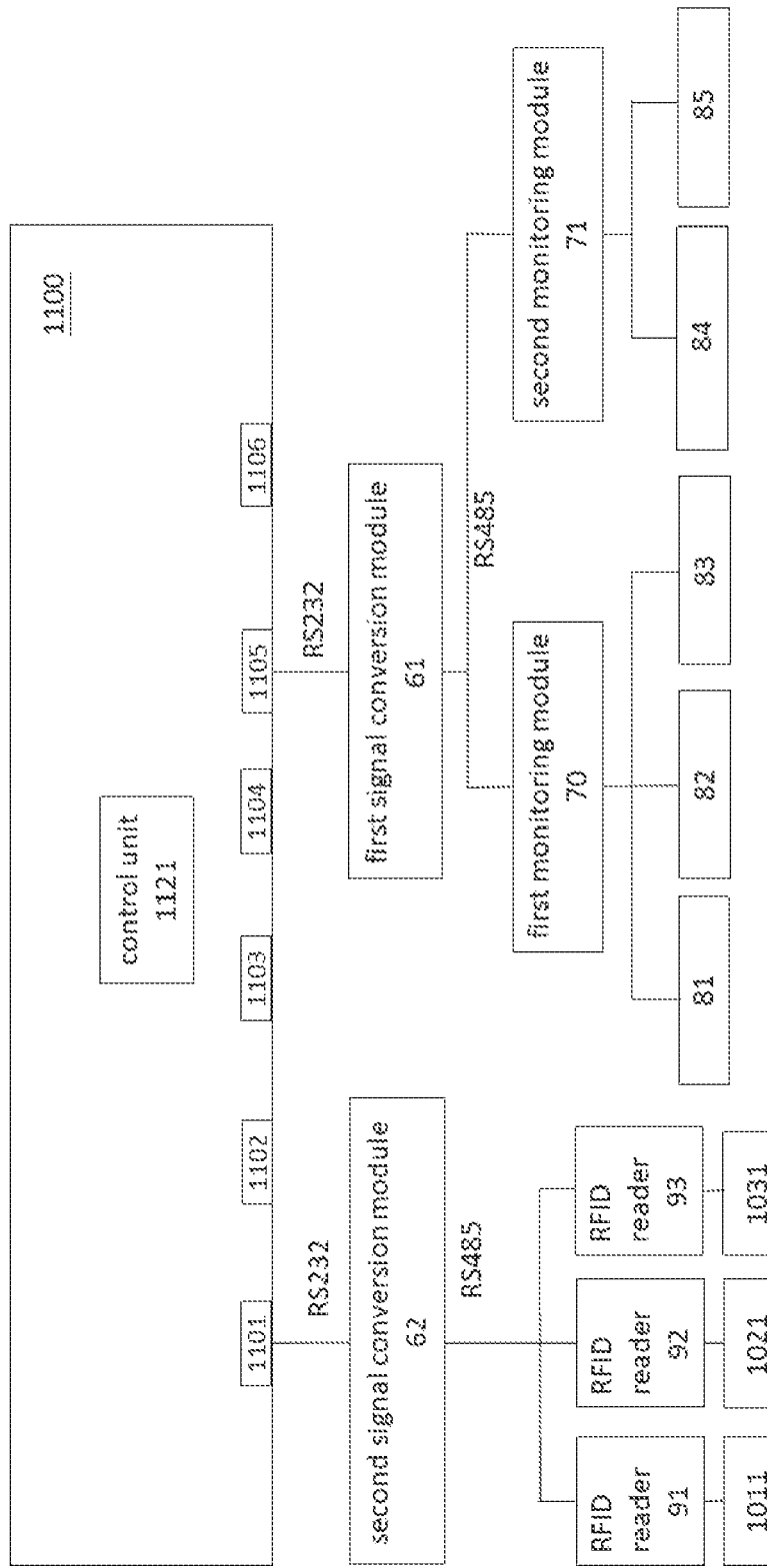
FIG. 2 is another system architecture diagram of the monitoring system of the present invention.

Next, referring to FIG. 2, which is another system architecture diagram of the monitoring system of the present invention. As shown in FIG. 2, the monitoring system of the present invention comprises a first signal conversion module 61, a first monitoring module 70, and a control device 1100. The first monitoring module 70 is electrically connected to the humidity sensor 81, the flow monitor 82 and the flow switch 83. The first signal conversion module 61 can be a gateway or a circuit board for converting different communication protocols and electrically connected one or more monitoring modules. For example, the RS485 or Modbus communication protocol is used between the first signal conversion module 61 and the first monitoring module 70, and the RS232 or Ethernet communication protocol is used between the first signal conversion module 61 and the control device 1100, wherein the first signal conversion module 61 can convert the signal from RS485 to RS232 and report it to the control device 1100. Since the communication protocol can have various combinations, it is not limited in the present invention. The first monitoring module 70 can be a control circuit board such as I/O circuit board or an analog circuit board, which is used to electrically connect a plurality of electronic components for signal reception, transmission and control. The control device 1100 may be an industrial computer with multiple communication ports, for example, six communication ports may be provided, namely communication ports 1101, 1102, 1103, 1104, 1105, and 1106, wherein the communication port 1105 is electrically connected the first signal conversion module 61, and other communication ports 1101, 1102, 1103, 1104, and 1106 can be used as spare ports. If the communication ports are insufficient, the control device 1100 may further include at least one virtual RS232 module (not shown in the figure) (serial device server) to expand the number of communication ports. For example, the virtual RS232 module may be the MOXA NPort 5400 series product. The first signal conversion module 61 or the second signal conversion module 62 can be electrically connected to the virtual RS232 module. The humidity sensor 81 is used to detect the relative humidity of the field, such as a cabinet, and transmit the relative humidity data of the field to the control device 1100 through the first monitoring module 70 and the first signal conversion module 61. The control unit 1121 of the control device 1100 controls the opening or closing of the flow switch 83 to determine whether to inflate the field according to the relative humidity data. For example, the control unit 1121 may be a programmable logic controller (PLC) or a central processing unit (CPU), which is not limited herein. For example, the flow monitor 82 is a flow meter which can monitor the flow of the inflation gas and can also be manually adjusted to set the inflation flow to a preset value. The flow monitor 82 can transmit the measured flow data through the first monitoring module 70 and the first signal conversion module 61 to the control device 1100. In another embodiment, the humidity sensor 81 is a temperature and humidity sensor, which can simultaneously detect temperature and relative humidity.

Furthermore, in the present, not only the first monitoring module 70, but also a second monitoring module 71 can be arranged, which is similar to the first monitoring module 70 in function and structure, is a control circuit board such as a I/O circuit board or an analog circuit board for electrically connected a plurality of electronic components, such as oxygen sensor 84, pressure sensor 85, temperature sensor (not shown in the figure), dew point sensor (not shown in the figure), etc., to detect respectively temperature, oxygen content, pressure and dew point. Similarly, the first monitoring module 70 can also be electrically connected to at least one of the oxygen sensor 84, the pressure sensor 85, the temperature sensor (not shown in the figure) and the dew point sensor (not shown in the figure). The value detected by any of the above-mentioned sensors are reported to the control device 1100 through the second monitoring module 71 and the first signal conversion module 61. When the environmental changes in the field (relative humidity, temperature, pressure, oxygen content or dew point) are higher than the set value, an alarm will be raised to remind the user, and the alarm can be in the form of a warning light or a sound. Alternatively, the field can be a cabinet (not shown in the figure), such as a cabinet with multiple shelves or drawers, or with at least a front door that can be opened or closed. When the front door is closed, there is an enclosed space inside the cabinet. The cabinet can be filled with inert gas or the XCDA. For example, when the front door is closed, the cabinet is filled with nitrogen gas, and the cabinet is pre-filled with the XCDA before the front door is opened or the nitrogen is exhausted. Further, the user can also use the terminal device (not shown in the figure) to remotely communicate with the control device 1100 to check the relative humidity data reported by the humidity sensor 81 to confirm whether the relative humidity in the field is normal. Otherwise, the user may check the data reported by other sensors or the flow monitor 82. Wherein, the terminal device (not shown in the figure) can be a mobile phone, PC, Server, Notebook or Palmtop.

In another embodiment, the monitoring system of the present invention further includes at least one RFID (Radio Frequency Identification) reader 91 and a second signal conversion module 62. In this embodiment, RFID readers 91, 92 and 93 are respectively electrically connected to the corresponding antenna elements 1011, 1021 and 1031, and are also electrically connected to the second signal conversion module 62. The second signal conversion module 62 is electrically connected to the communication port 1101 of the control device 1100. The second signal conversion module 62 can be a gateway or a circuit board for converting different communication protocols to convert the signal obtained by the RFID reader 91 from RS485 to RS232 and report it to the control device 1100. When the field is a cabinet, at least one object (not shown in the figure) can be placed in the cabinet, and the placed object can be a reticle, a reticle box, a wafer box, a chip, a wafer, a probe card, a probe card box or other semiconductor-related materials, wherein the object may be arranged with a RFID tag storing the information which can be read by the RFID reader 91 through the antenna element 1011 to report to the control device 1100. Next, in one embodiment, assuming that the preset relative humidity value in the field (for example, a cabinet) is set as 5% as the preset threshold, when the humidity sensor 81 detects the relative humidity 50% in the field, the control unit 1121 will turn on the flow switch 83 to inflate the field, such as inflating with nitrogen gas, and pre-adjust the flow monitor 82 so that the inflation rate is fixed at a predetermined value, such as 30 liter/mil, and continue to inflate. When the relative humidity is equal to or lower than 5%, the flow switch 83 is turned off by the control unit 1121 and the inflation is stopped. When the relative humidity in the field drops to the preset threshold value 5%, the humidity sensor 81 will continue to detect the relative humidity in the field and will also continue to transmit the detected relative humidity data to the control device 1100. After a period, such as 30 minutes, when the humidity sensor 81 detects that the relative humidity in the field exceeds the preset threshold value 5% again, the control device 1100 will turn on the flow switch 83 again to inflate the field. After the relative humidity data in the field drops to a relative humidity of the preset threshold value 5% or lower, the inflation process is stopped. In the present invention, it is not necessary to continuously and quantitatively operate the inflation to save gas costs, it can also save electricity or energy consumption and further reduce costs. In addition, the user can also remotely communicate with the control device 1100 through the terminal device (not shown in the figure) to monitor the field information such as relative humidity, temperature, pressure, oxygen content, dew point, etc. The field information is reported to control device 1100 by the first monitoring module 70 or the second monitoring module 71 to confirm whether the monitoring value in the field is normal. The user can also adjust or set the preset threshold value of the field information, such as relative humidity, of the field through the terminal device. Furthermore, different gases can be set at different inflation rates, for example, nitrogen gas is a fixed flow rate in the range of 20 to 40 liter/min, and XCDA is a fixed flow rate in the range of 130 to 200 liter/min.

In normal condition, when the field is a enclosed environment, the relative humidity in the field changes slowly, so when the humidity deviates from the preset value, the control unit 1121 turns on the flow switch 83 to inflate until the relative humidity in the field back to the preset threshold value. In addition, when the humidity sensor 81 detects a drastic change in the relative humidity, the control device 1100 will issue a warning, such as a buzzer sound or a warning light, to remind the operator that there may be abnormal in the field and should check immediately to maintain a proper storage environment. The user can also adjust the warning parameters of the control device 1100 through the terminal device, and an alert will be issued when the reported field information reaches any specified value as the user requirement.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A monitoring system, comprising:
   a first monitoring module electrically connected to a humidity sensor used to detect a relative humidity of a field;
   a control device including a control unit and the data of an inflation rate table stored therein;
   a flow controller electrically connected to the control device, wherein the control unit controls the flow controller according to the data of the inflation rate table to provide an inflation rate corresponding to the relative humidity of the field; and
   a first signal conversion module electrically connected to the control device and the first monitoring module, wherein, when a first inflation rate corresponds to the relative humidity of the field in a first interval, and a second inflation rate corresponds to the relative humidity of the field in a second interval, the relative humidity of the field in the first interval is greater than the relative humidity of the field in the second interval, and the first inflation rate is greater than the second inflation rate.

2. The monitoring system according to claim 1, further comprising:
   a RFID reader electrically connected to an antenna element; and
   a second signal conversion module electrically connected to the control device and the RFID reader, wherein the first signal conversion module and the second signal conversion module are respectively a gateway or a circuit board for converting different communication protocols.

3. The monitoring system according to claim 1, wherein the first monitoring module is a control circuit board.

4. The monitoring system according to claim 1, wherein the inflation rate is different corresponding to the different gas in the same humidity.

5. The monitoring system according to claim 1, wherein the first monitoring module electrically connects at least one of an oxygen sensor, a pressure sensor, a temperature sensor, a dew point sensor and a flow monitor.

6. The monitoring system according to claim 1, further comprising a second monitoring module electrically connected to the first signal conversion module and at least one of an oxygen sensor, a pressure sensor, a temperature sensor, a dew point sensor and a flow monitor, wherein the second monitoring module is another control circuit board.

7. The monitoring system according to claim 1, wherein the field is a cabinet.

8. The monitoring system according to claim 2, wherein the control device comprises at least one serial device server, and the first signal conversion module or the second signal conversion module electrically connects the serial device server.

* * * * *